May 16, 1933.  D. D. BARNUM  1,909,745

AUTOMATIC GAS CUT-OFF VALVE

Filed May 15, 1931

Inventor:
Dana D. Barnum,
by Emery, Booth, Varney & Townsend
Attys

Patented May 16, 1933

1,909,745

UNITED STATES PATENT OFFICE

DANA D. BARNUM, OF BOSTON, MASSACHUSETTS

AUTOMATIC GAS CUT-OFF VALVE

Application filed May 15, 1931. Serial No. 537,649.

This invention relates to automatic thermal gas valves designed to be interposed between the main or service pipe and the gas meter, and intended automatically to shut off the flow of gas from the main to points beyond the valve in the event of an abnormal rise in temperature, such as would result from a fire in the vicinity of the meter.

One object, among others, is to provide a simple form of such valve, of inexpensive construction and installation, as well as one which will effect a substantially complete stoppage of the gas flow after the fire has subsided and until opportunity may be had for such repairs as are needed.

The simplest form of such an automatic valve comprises a gravity-actuated, valve-closing member held or suspended in its open position by solder or other fusible substance having a relatively low melting point and so arranged that on an abnormal rise in temperature the valve is released and drops through the action of gravity to close a port in the supply pipe and stop or impede the further flow of gas. Such valves, however, as heretofore constructed, whether of spherical or other form, have required specially constructed housings or fittings which must be inserted in the now standardized pipe connections to the meter. Such standardized connections comprise a short, vertical, meter-supply pipe connection, between which and the vertically aligned service pipe connection there is interposed a gas cut-off valve. The latter comprises a valve casing having ports arranged in vertical alignment, one opening into the meter supply pipe, and the other into the overhead supply pipe, and controlled by a transverse, horizontally arranged, hollow, tapered plug valve rotatably mounted in a tapered seat in the casing and having transverse ports which, by turning the valve, may either turn on or shut off the gas supply from the service pipe.

The installation of specially constructed housings or fittings for automatic valves, therefore, particularly in the case of meters already in use, requires a re-arrangement of the service pipe connections which adds to the expense attending the use of such valves, and in many instances, where service pipe connections are such as to require more or less elaborate changes or alterations, adds materially to that expense.

One of the objects of the present invention is to provide a simple form of gravity-actuated valve which may be installed in the standardized arrangement of pipe connections without the necessity of disturbing the latter in any way and with substantially no expense attending such installation. In the illustrated embodiment of the invention, this is accomplished by installing a gravity-actuated, valve-closing member in the hollow valve plug of the cut-off valve itself, so arranged that, in spite of the horizontal position occupied by this valve, the valve closing member will re-act to an abnormal rise in temperature, and thereupon drop into such a position as to close the underlying meter supply port and interrupt the gas supply. The cut-off valve and valve plug containing such valve closing member may be manufactured at insignificant cost and may be installed in any already established meter supply connections by merely removing the old or standard form of plug and inserting the new one so equipped in its place, or by inserting a new valve chamber equipped with the new plug, whichever may appear advisable, and without the necessity of touching or disturbing the service pipe connections or other parts.

Automatic valves which are seated by gravity action alone, even when new and made with the utmost care and precision, have been found to act as an impedance only to gas flow. After being seated there continues a very substantial leakage, which may amount to from 10% to 30% of the normal supply, and which after long continued installation, with resulting impairment of the seating and contacting surfaces, may be substantially greater. This impedance is sufficient to suppress or check any substantial addition to the conflagration occurring in the vicinity of the meter which might otherwise take place, were the normal supply of gas to be continued, but, after the fire has been extinguished, this continuing leakage accumulates and tends to form an explosive gas pocket of enlarging size in the vicinity of the meter and to create in a short time a condition which may be and usually is extremely dangerous.

Another object of the present invention is to avoid this condition, especially in the case of a gravity-actuated valve member, by providing a gas-tight seal for the seat of the valve member, which becomes effective as soon as the surrounding temperature drops to normal, thereby securing a complete stoppage of the gas flow from that time on.

In the illustrated embodiment of the invention this is secured by coating the contacting walls of the valve closing member, or its seat, or both, with a cementitious substance which is hard or solid at normal temperatures but which is adapted to soften in the presence of heat and which forms a cementing film between the gravity valve member and its seat when the former drops into place. This serves to more effectively impede the gas flow during the time the adjoining fire is in progress, and, when the fire subsides and the temperature drops, the adhering film hardens and cements the valve member to its seat, forming a substantially gas-tight seal.

These and other objects of the invention will be best understood by reference to the following description when taken in connection with the accompanying illustration showing one specific embodiment thereof, while its scope will be more particularly pointed out in the appended claims.

Figure 1:
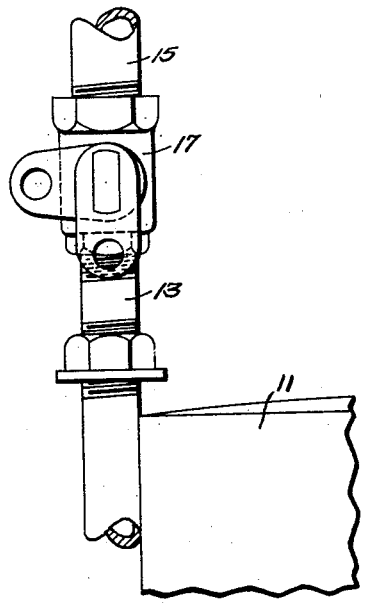
Fig. 1 is an elevation, partly broken away, showing a portion of the gas meter with the usual standardized pipe connections thereto.

Referring to the drawing and to the illustrative embodiment of the invention, as shown in Fig. 1, the standardized meter connections comprise the meter 11, the short vertical meter supply pipe 13, the vertically aligned service pipe connection 15 and the interposed cut-off valve. The latter (Figs. 2, 3 and 4) consists of a valve casing or housing 17 having the lower port 19 communicating with the meter supply pipe and the vertically aligned upper port 21 communicating with the service pipe, the ports being controlled by the usual horizontally positioned, rotatable, hollow valve plug 23 which is tapered and works in a tapered seat in the valve casing. The valve is provided with similar, oppositely arranged ports 25 and 27 adapted to register (as in Figs. 2 and 3) with the casing ports 19 and 21 when the valve is turned to its open position, or to be moved out of communication therewith to cut off the supply when the valve is turned 90° from the position shown.

Figure 3:
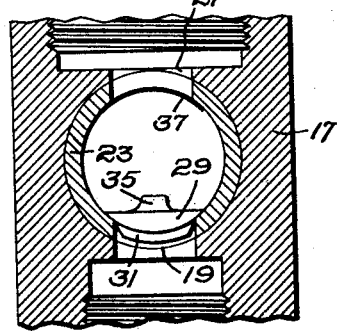
Fig. 3 is a view similar to Fig. 2, showing the valve member released and closed.

To automatically cut off the gas supply on an abnormal rise of temperature, a gravity-actuated, port-closure member 29 is employed positioned in the hollow interior of the valve plug. The closure member 29 comprises an elongated plate-like portion of the shape conforming to the contour of the interior walls of the hollow plug adjacent the port and adapted, when the closure member is dropped, to overlie and rest on the edges of the port, as shown in Fig. 3. The front of the closure member may be formed as shown, with a protruding face 31 suitably shaped to assist in centering the closure member in and over the port and also serving to give added weight to that side of the closure member.

When the closure member is installed in the valve plug it is secured to the side walls of the hollow interior of the plug substantially midway between the ports 25 and 27 by means of a small body 33 of solder or other suitable fusible material, the back of the closure member having a small raised portion or lug 35 to which the solder is applied.

Figure 2:
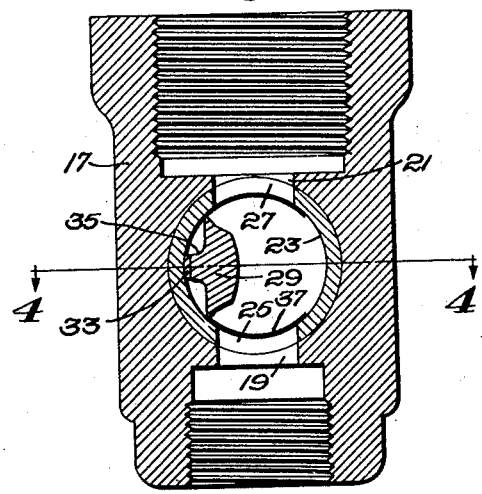
Fig. 2 is a vertical, cross-sectional elevation taken through the gas cut-off valve, the latter being equipped with an automatic valve closing member embodying one form of the invention, the valve closing member being shown as held in its normal or open position.
Figure 4:
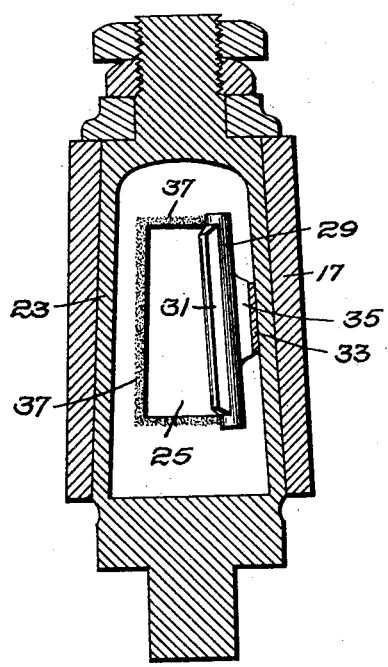
Fig. 4 is a sectional plan on the line 4—4 in Fig. 2.

In this position, as will be seen from Figs. 2 and 4, it is held with its longitudinal edges so related to the longitudinal edges of each port, and its transverse edges so related to the transverse edges of each port, that when released, as by the melting of the fusible metal attachment, it will fall over the lowermost port (assuming the valve to be in the open position, as shown in Fig. 2), the protruding face of the closure member entering the port, centering the member therein, and causing the port to be closed by the overlapping and conforming edges of the closure member. This closing movement is further facilitated by the eccentric disposition of the mass of the closure member embodied in its protruding face which causes the center of gravity to overhang both the point of attachment of the fusible body and the lower contacting edge of the plate and causes it to execute a half turn and rock accurately into closing position about the lower contacting longitudinal edge or area of the closure member. It will be observed that the automatic valve is operative and is effective to automatically close the lowermost port, whether the plug valve is positioned as shown in Fig. 2 with the port 25 beneath, or in a position 180° therefrom with the port 27 beneath. Furthermore, when the valve is dropped into position, the gas pressure in the service main assists in giving the closure member a firmer and more effective seat.

To provide a gas-tight seal for the closure member adapted to become effective as soon as the surrounding temperature drops to normal, I preferably coat the inner walls of the valve plug where they surround the ports, or that part of the outer surface of the closure member which is adapted to contact with those walls when the valve is seated, or both the valve plug and the closure member, with a cementitious substance 37 which remains solid and hard at normal temperatures but which will fuse or soften under abnormally high temperatures. Various substances may be used for this purpose but a thick mixture of ordinary shellac will serve the purpose.

In the case of an abnormal rise of temperature, such as might be caused by a fire in the vicinity of the meter, the shellac will soften and melt, offering no impediment to the dropping and seating of the valve when the latter is released by the melting of the fusible metal attachment 33. The closure member accordingly seats itself on the melted shellac, which, during the continuance of the high temperature and while still remaining in a melted condition, further minimizes the leakage of gas which can take place through the port thus closed. When the fire subsides and the temperature drops, the shellac hardens, cementing the closure member to its seat and forming what is in effect a gas-tight seal, preventing substantially all further gas leakage through the closed port. Since the interior of the valve is cut off from any supply of air or oxygen, the shellac cannot burn or disintegrate, but remains in its fluid condition during the continuance of the high temperature, and, although any excess of shellac may gravitate away, there remains at all times a contacting film between the closure member and the edges of the port on which it seats which becomes effective to form the cementing seal when the temperature again drops.

While I have herein shown and described for the purpose of illustration one specific embodiment of the invention, it is to be understood that extensive deviations may be made from the details of construction and the form and arrangement of the closure member and other parts, all without departing from the spirit of the invention.

I claim:

1. A cut-off gas valve having a chambered valve plug with upper and lower ports and provided with means automatically to close one of the ports thereof under excessive heat, the same comprising a plate-like member with a fusible attachment to the side walls of the plug chamber between the ports, the center of gravity of said member being eccentric with relation to its area of contact with the walls of the chamber, whereby when released it executes a partial turn and drops over the underlying port to close the same.

2. A cut-off gas valve with connections therefor, said valve comprising a valve casing positioned in said connections to present a vertical gas supply passage, said valve casing having a horizontally positioned chambered valve plug in said passage having oppositely disposed ports adapted to open and close said passage, and means automatically to close the passage under excessive heat, the same comprising a gravity-actuated, plate-like member normally held within the chamber of said valve plug and a fusible attachment constituting the sole means for holding it to the inner walls of the chamber of said plug between the ports thereof, said member in the horizontal and passage-opening position of the plug being gravitationally related to a seat surrounding one of said ports to drop into closing relation thereto to close the supply passage on the fusing of said attachment.

3. An automatic thermal gas valve with connections therefor, said valve comprising a valve casing positioned in said connections to present a vertical gas supply passage provided with oppositely related ports, a rotary, horizontally positioned tapered, chambered, valve plug seated in said casing having oppositely related ports adapted to open and close the passage, and means within the chamber of said plug for closing a port thereof under excessive heat when said valve plug is in its passage-opening position, the same comprising a port closing member with a fusible attachment for holding it to the side walls of the chamber, said member being gravitationally related to said port to rock outwardly on the fusing of said attachment and drop into closing position over said port.

4. In a device of the class described, a gas cut-off valve comprising a valve casing with vertically aligned upper and lower ports, a horizontally positioned, rotatable, chambered, valve plug having oppositely related ports adapted to open the ports in said casing, and means within the chamber of said valve plug for closing a port thereof, comprising a gravity-actuated, port-closing member with a fusible attachment for holding it to the inner walls of said chamber, said member being gravitationally related to the underlying port in said valve plug to drop into closing position with relation thereto on the fusing of said attachment.

5. A cut-off gas valve having a chambered valve plug provided with upper and lower oppositely disposed ports, a gravity-actuated, port-closing member within the chamber of said valve and having a fusible attachment for holding it to the walls of said chamber, said member being gravitationally related to the underlying port in said valve plug to drop into closing position and close that port only on the fusing of said attachment.

6. A cut-off gas valve having a chambered, ported, valve plug provided with a gravity-actuated closure member contained within the chamber thereof, a fusible attachment for holding the closure member in open position but adapted to permit the same to drop to a closed position at abnormally high temperatures, and means for effecting a gas-tight seal for said closure member when the temperature drops, comprising a coordinately related fusible body adapted to soften when hot and harden when relatively cold.

7. In a device of the class described, a gas cut-off valve with connections therefor, said valve comprising a valve casing positioned in said connections to present a vertical gas supply passage, a horizontally positioned, rotatable, chambered valve plug in said passage adapted to open and close the same, and means normally held within the chamber of said valve for automatically closing said passage when said valve plug is in its passage-opening position comprising a gravity-actuated, passage closing member with a fusible attachment constituting the sole means for holding it to the inner walls of the chamber, said member, in the horizontal and passage-opening position of said plug, being gravitationally related to a seat in said supply passage to drop into closing relation thereto on the fusing of the attachment.

8. In a device of the class described, a gas cut-off valve with connections therefor, said valve comprising a valve casing, a horizontally rotatable valve plug provided with ports, said valve casing being positioned in said connections to present with said ports a substantially vertical gas supply passage having a seat for the hereinafter mentioned passage-closing member, said plug lying across said passage and adapted to open and close the same and said plug further having an interior chamber provided with tapered walls, and means normally held within the chamber for automatically closing said passage comprising a gravity-actuated, passage-closing member with a fusible attachment constituting means for holding it to the inner walls of the chamber, said member in the horizontal, passage-opening position of said plug being gravitationally related to said seat in said supply passage to drop in closing relation thereto to close said supply passage on the fusing of said attachment.

9. In a device of the class described, a gas cut-off valve and connections therefor, said valve comprising a valve casing, a rotatable chambered valve plug in said casing, said casing being positioned in said connections to present with said plug a gas supply passage having a seat for the hereinafter mentioned closing member, and means for automatically closing said passage under excessive heat, the same comprising a gravity-actuated, passage-closing member normally held within the chamber of said plug with a fusible body constituting the sole attachment of said member to the inner walls of said chamber, said member being otherwise free and said plug being formed and positioned to normally open said passage and gravitationally relate said member to said seat to cause said member to drop freely under the influence of gravity alone into closing relation to said seat on the fusing of said attachment.

In testimony whereof, I have signed my name to this specification.

DANA D. BARNUM.